US011883841B2

(12) United States Patent
Shahriar et al.

(10) Patent No.: US 11,883,841 B2
(45) Date of Patent: Jan. 30, 2024

(54) CAULK RESHAPING TOOL

(71) Applicants: Khaled Shahriar, Farmingdale, NY (US); Armando Aguilar, East Northport, NY (US); Nhut Pham, Doraville, GA (US)

(72) Inventors: Khaled Shahriar, Farmingdale, NY (US); Armando Aguilar, East Northport, NY (US); Nhut Pham, Doraville, GA (US)

( * ) Notice: Subject to any disclaimer, the term of this patent is extended or adjusted under 35 U.S.C. 154(b) by 0 days.

(21) Appl. No.: 17/824,856

(22) Filed: May 25, 2022

(65) Prior Publication Data

US 2022/0395853 A1 Dec. 15, 2022

Related U.S. Application Data

(60) Provisional application No. 63/209,371, filed on Jun. 10, 2021, provisional application No. 63/193,007, filed on May 25, 2021.

(51) Int. Cl.
*B05C 17/00* (2006.01)
*B05C 17/005* (2006.01)

(52) U.S. Cl.
CPC .............................. *B05C 17/00516* (2013.01)

(58) Field of Classification Search
USPC ....... 118/256, 258, 259, 262, 410, 414, 413; 401/208, 219; 429/13, 17, 19
See application file for complete search history.

(56) References Cited

U.S. PATENT DOCUMENTS 6,394,681 B1 * 5/2002 Moore .................. F16K 15/147 401/218
7,281,875 B1 * 10/2007 Todd ....................... B05C 17/02 401/219

* cited by examiner

*Primary Examiner* — Yewebdar T Tadesse
(74) *Attorney, Agent, or Firm* — Yong Chen

(57) ABSTRACT

A device for scraping caulk is adapted to be used with a caulk gun. The device includes a base plate having a central void and an elongated portion extending from the base plate along an axis perpendicular to the base plate. The device can be fitted between a caulk tube and a caulk gun to allow the application of caulk and the scraping/reshaping of the caulk in a single run. The device can include different replacement tips useful for different applications and different desired results.

19 Claims, 12 Drawing Sheets

CAULK RESHAPING TOOL

CROSS REFERENCE TO RELATED APPLICATIONS

This application claims the priority to U.S. Provisional Application No. 63209371 filed Jun. 10, 2021 and to U.S. Provisional Application No. 63193007 filed May 25, 2021, the disclosure of each of which is incorporated by reference herein in its entirety.

Background

In various architecture and engineering applications, a seal needs to be applied to joints or seams between two adjacent surfaces to dose existing or potential gaps or cracks to prevent the passage of air or water. Caulk is a material commonly applied at the joints or seams in a pliable form. When dried, the caulk forms a somewhat tacky or adhesive body that is also somewhat flexible.

Caulk is usually provided in caulk tubes, which can be used on its own, or loaded on a caulk gun for dispensing the caulk from the caulk tube in a more controlled manner.

To obtain a more aesthetically pleasing look and a desired profile, applied caulk can be smoothed by a finger, a spoon, or other smoothing or scraping tool. This caulk reshaping step is often performed after a caulk "bead" is formed and before the caulk dries. Typically, a separate caulk working tool is used for such purpose after caulk has been applied by a caulking gun. There is a need for improved tools for working caulk.

SUMMARY OF THE INVENTION

In one aspect, the present disclosure provides a device for scraping caulk adapted to be used with a caulk gun having a cartridge holder front plate and a cartridge plunger, the device comprising: a base plate having a central void; and an elongated portion extending from the base plate along a central longitudinal axis perpendicular to the base plate, the elongated portion comprising a first, proximal end and a second, distal end, wherein the second end is closer to the axis than the first end.

The base plate can be configured to be disposed against and contacting the cartridge holder front plate of the caulk gun and encircle a nozzle of a caulk tube.

In some embodiments, the first end has a greater width than the second end, and tapers toward the second end.

In some embodiments, the second end is curved or bent toward the axis.

In some embodiments, the device further comprises a strengthening ridge disposed on an interior side of the elongated portion.

In some embodiments, the base plate comprises a complete ring.

In some embodiments, the elongated portion generally curves toward the axis.

In some embodiments, the elongated portion includes a cavity for collecting excess caulk.

In some embodiments, wherein the base plate and the elongated portion are constructed from a plastic in one piece. In other embodiments, the base plate and the elongated portion are constructed in separate parts, and are configured to removably engage each other.

In some embodiments, the elongated portion further comprises a first portion proximal to the base plate, and a second portion distal to the base plate, wherein the first portion comprises a channel to slidably engage the second portion to allow the second portion to move in a direction parallel to the axis relative to the first portion. In some of these embodiments, the second portion comprises a plurality of engagement elements arranged along its longitudinal direction.

In some embodiments, the elongated portion can flex with respect to the axis.

In some embodiments, the second end of the elongated portion includes an engagement element for engaging a replacement tip. The engagement element can be a through hole.

In some embodiments, the device further comprises a replacement tip constructed with an elastomeric material, the replacement tip configured to engage the second tip of the elongated portion. The replacement tip can have a flat terminal end or a rounded terminal end. The replacement tip can include a cavity for collecting excess caulk.

In some embodiments, the engagement element of the elongated portion is a through hole, and wherein the replacement tip comprises a protrusion which can be fitted in the through hole.

It is to be understood that both the foregoing general description and the following detailed description are exemplary and are intended to provide further explanation of the invention claimed.

The accompanying drawings, which are incorporated in and constitute part of this specification, are included to illustrate and provide further understanding of the device of the invention. Together with the description, the drawings serve to explain the principles of the invention.

DETAILED DESCRIPTION OF EMBODIMENTS OF THE INVENTION

Figure 1:
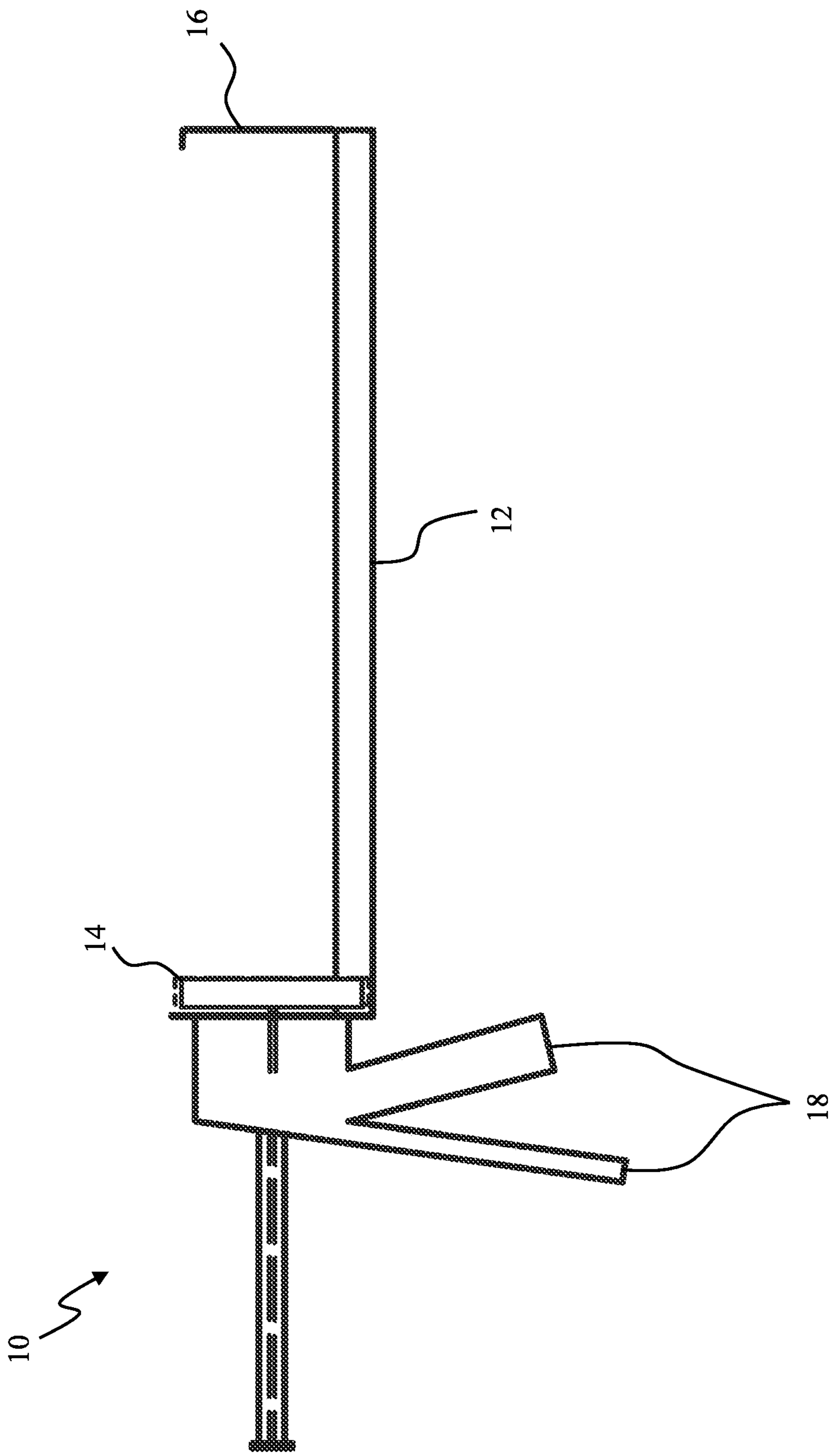
FIG. 1 (Prior Art)
FIG. 1 is a schematic illustration of a conventional manually operated caulk gun.

In an aspect, the present disclosure provides a caulk reshaping tool (a device for scraping caulk) in various sealing and caulking applications. The device is also referred herein as the "adaptor." The device is generally used in connection with a conventional caulk gun (or caulking gun) 10 as shown in FIG. 1, which includes cartridge (or caulk tube) holder body 12, cartridge holder front plate (or front guard) 16, plunger 14, and handle 18. Without the adaptor disclosed herein, a user loads a caulk tube with the nozzle (or spout) side through the opening of the front plate, and squeeze the handle of the caulk gun to push the plunger forward, thereby pushing the movable bottom of the caulk tube and causing the caulk to be dispensed from the nozzle.

As illustrated in FIGS. 2A-2D and 4A-4B, the device includes a base plate 110 having a central void 111 which allows a nozzle of the caulk tube to pass through. The base plate can be fitted between the cartridge holder front plate of the caulk gun and the front end of the caulk tube. In this manner, the spring action of the caulk gun can tightly hold the adaptor in place for use.

As shown in FIGS. 2A-2C and 4A-4B, the base plate can be a complete (closed) ring. The outer diameter of the base plate can be substantially the same as the cylinder diameter of the caulk tube. However, it is understood that any cross-section shape for the base plate that has a central void is contemplated. For example, the central void can take a circular shape, an elliptical shape, or a shape of a regular polygon, etc. The base plate need not to be complete centrally symmetric. For example, FIG. 2D shows a base plate having a partial ring configuration.

As used herein, "base plate" refers to the attachment portion of the adaptor disclosed herein. While the base plate generally takes a thin planar shape in its major surfaces, it is not restricted to any particular thickness.

As shown in FIGS. 2A-2B and 4A-4B, the adaptor also includes an elongated portion 120 extending from the base plate 110 along a central longitudinal axis 101 perpendicular to the base plate (the axis 101 passing the center of the central void), the elongated portion comprising a first, proximal end 122 and a second, distal end 124, wherein the second end is disposed closer to the axis than the first end. In the circumferential direction, the first end 122 can be disposed along a portion of an outer circumference of the base plate, e.g., 10-15% of the cross-section perimeter of the base plate. When the adaptor is loaded together with the caulk tube onto a caulk gun, the axis 101 can be considered to substantially coincide with the longitudinal axis of the caulk tube.

The distance between the first end 122 to the axis 101 can be substantially the same with the diameter of a typical caulk tube, e.g., about 3.5 inches, or greater or smaller. How closely the second end of the elongated portion is disposed relative to the axis 101 can depend on the desired profile of the caulk after the scraping, for example, a few mm or near zero. In some instances, and as shown in FIG. 2B, the second end slightly crosses over the axis 101. Alternatively, the second end can be positioned on the axis 101, or slightly above the axis 101 (i.e., not across the axis 101). If the base plate is installed between the front plate of the cartridge holder of the caulk gun and the front end of the caulk tube, the axial length $L_A$ of the elongated portion should be slightly longer than that of the spout of the caulk tube, e.g., it can be about 105%-110% of the axial length of the spout of the caulk tube. In any event, the distal end of the elongated portion should be disposed apart from the spout tip with an appreciable gap to allow the formation of a normal caulk bead, e.g., a few mm to about 20 mm.

As shown in FIGS. 2A-2D and 3A-3D, the elongated portion can have a general "claw" shaped configuration, wherein the first end has a width W1 greater than that of the second end W2, and generally tapers form the first end toward the second end, with the elongated portion generally curving toward the axis. The second end 122 can be curved toward the axis. The tip of the second end can be rounded. However, different other configurations are contemplated, as will be described further below in connection with other figures herein.

Figure 2A:
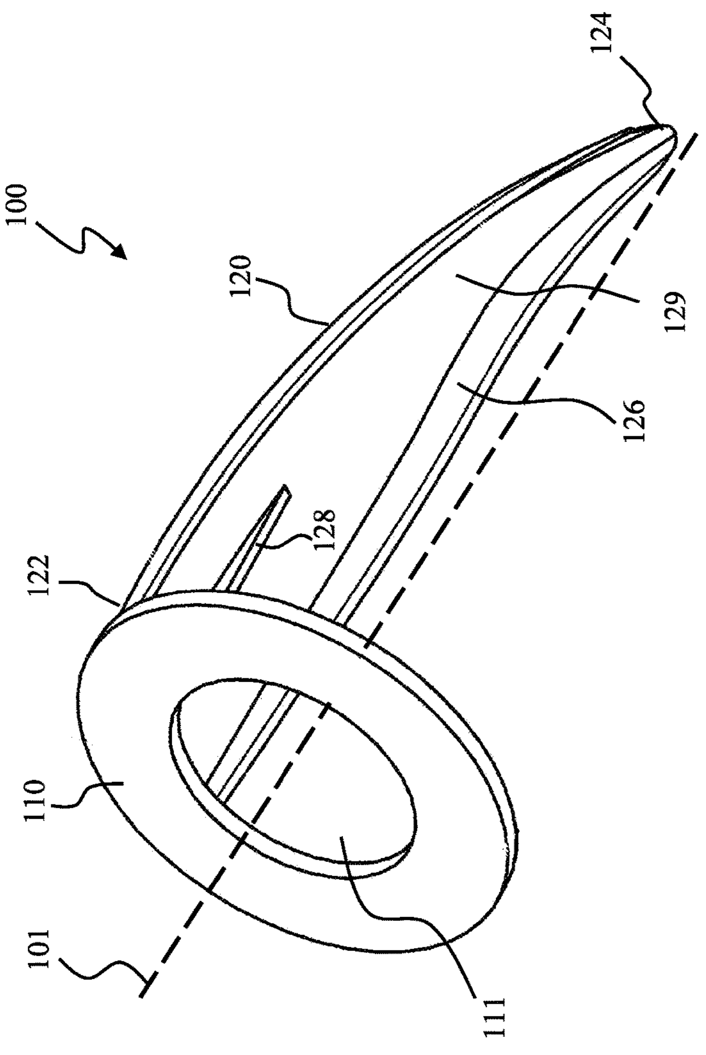
FIGS. 2A-2C are schematic depictions of an adaptor according to certain embodiments of the present disclosure.
Figure 2B:
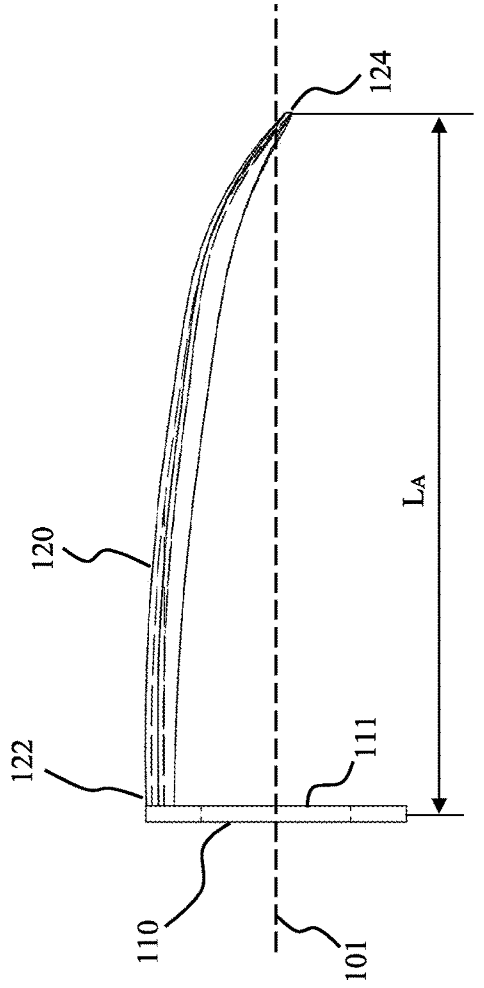

As shown in FIG. 2A, the elongated portion can generally take a sheet-like shape and include a curved top portion and a pair of side skirt portion 126 which runs along the length direction of the elongated portion. On the interior side of the elongated portion there is formed a cavity 129 between the two side skirt portions 126 for collecting excess caulk scaped from the caulking operation. It can also include a strengthening ridge 128 disposed on an interior side surface of the elongated portion, proximal to the first end of the elongated portion. These elements can provide added structural strength to the elongated portion while reducing the amount of material used.

The adaptor (both base plate and the elongated portion) can be made from common engineering plastics, such as polypropylene, polycarbonate, polycarbonates, polyethylene terephthalate, polybutylene terephthalate, polyetherketone, ABS, etc. In some embodiments, both of the base plate and the elongated portion can be constructed in a one-piece construction, e.g., by inject molding. In some embodiments, the elongated portion is rigid. In some embodiments, the elongated portion can flex relative to the longitudinal axis. Under applied tension, the second end can bend away from the axis and transfer the pressure to reshape the caulk. The degree of the flex can depend on the material of construction of the elongated portion, the size and dimension of the elongated portion, and applied tension in a caulking operation, etc. Alternatively, the base plate and the elongated portion can be constructed in separate parts, and are configured to removably engage each other, as will be further illustrated in connection with FIGS. 8 and 9.

Figure 2C:
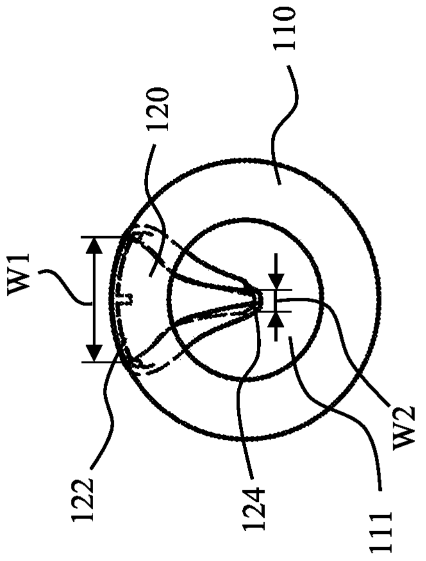
Figure 2D:
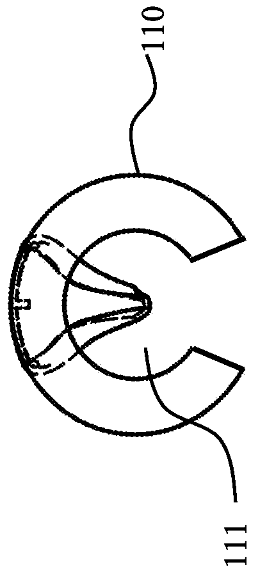
FIG. 2D is a schematic depiction of an adaptor according to certain embodiments of the present disclosure.
Figure 3A:
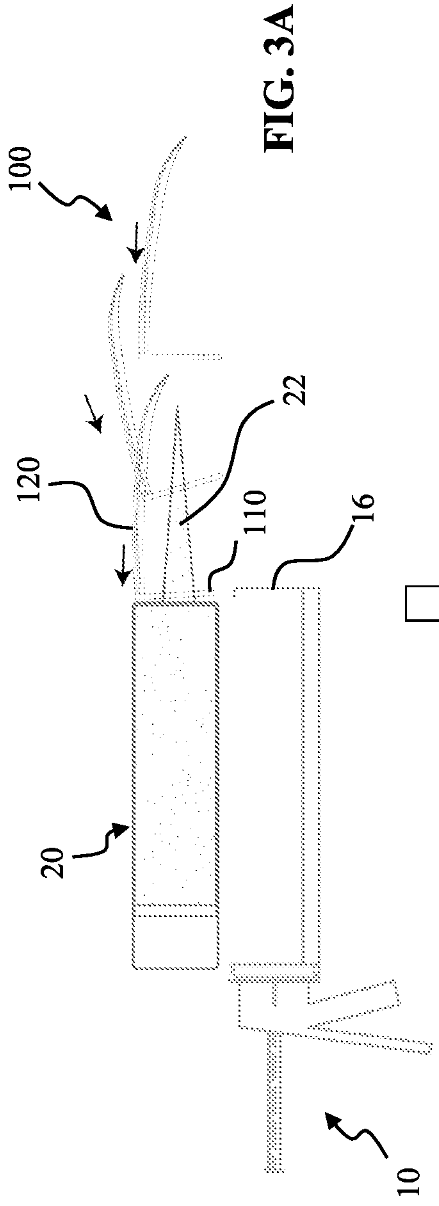
FIGS. 3A-3C show an example procedure to load an adaptor of the present disclosure with a caulk tube onto a caulk gun.
Figure 3B:
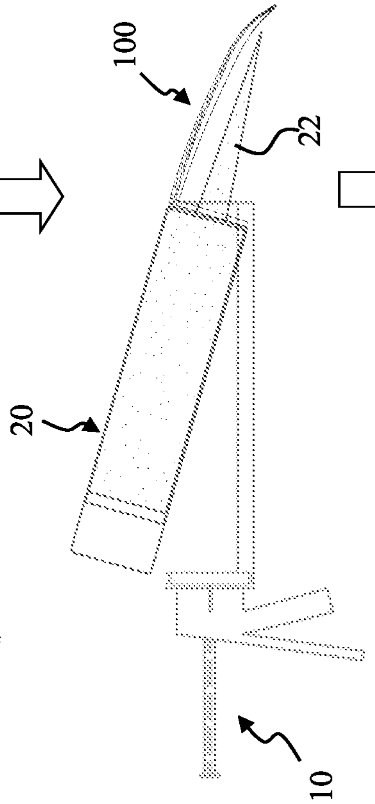
Figure 3C:
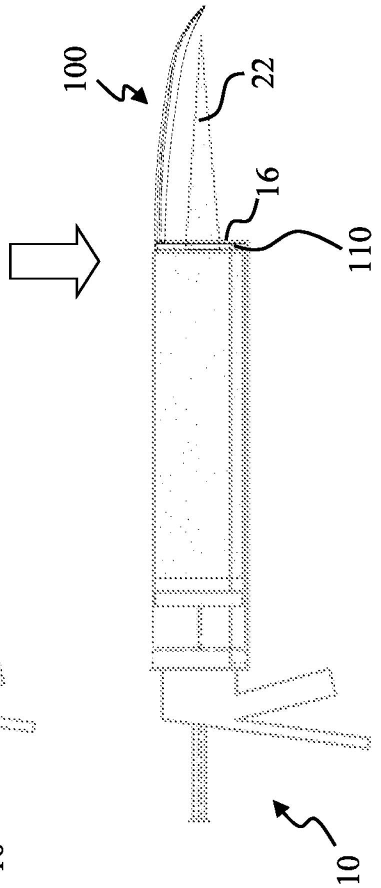
Figure 3D:
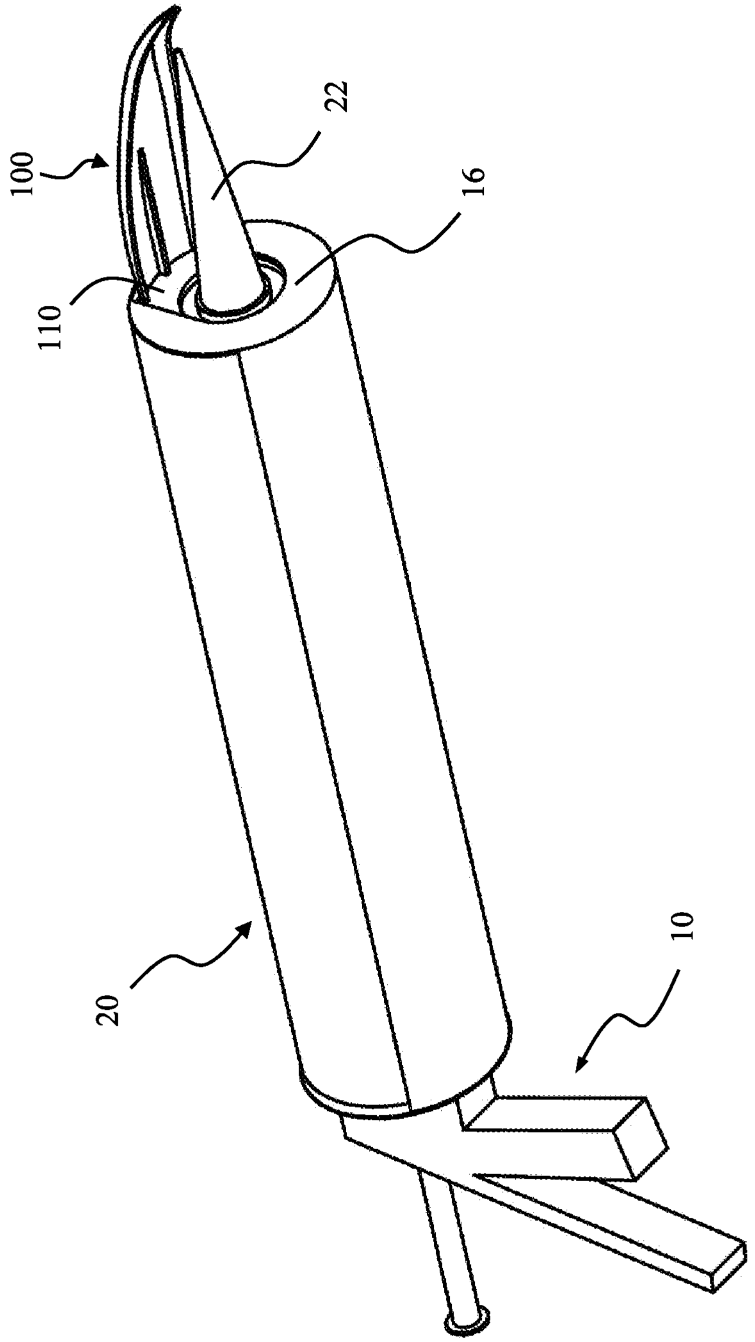
FIG. 3D is a perspective view of the final configuration of an adaptor of the present disclosure loaded with a caulk tube onto a caulk gun.

FIGS. 3A-3C illustrate how an adaptor 100 shown in FIGS. 2A-2C can be loaded with a caulk tube 20 onto a caulk gun 10, which is quite self-explanatory. The adaptor 100 is first placed on the caulk tube 20 with its central void (not shown) passing the nozzle 22 of the caulk tube, and then the two parts are held together to be loaded head first onto the caulk gun. As shown, the base plate 110 is disposed between the front end of the caulk tube and the cartridge holder front plate 16 of the caulk gun 10. Its central void has a size or dimension sufficient to encircle the nozzle 22 of the caulk tube 20. When the loading is completed, the assembled caulk gun 10, caulk tube 20 and adaptor 100 are shown in FIG. 3D, where the base plate of the adaptor 100 is held between the front plate 16 of the cartridge holder of the caulk gun 10 and the front end of the caulk tube 10.

It is quite intuitive to use the adaptor as loaded with on the caulk tube and on the caulk gun. A user can use the caulk gun as he or she would normally use it, moving the caulk gun backward slowly while pointing the nozzle at the crack to be sealed and applying consistent pressure to the plunger to push out the caulk from the nozzle. When the adaptor is properly installed, it forms a fixed configuration relative to the caulk tube, with the tip (second end) of the adaptor positioned at a desired distance from the opening of the nozzle. Thus, the “fresh” bead formed by the released caulk will be immediately scraped and/or reshaped by the adaptor in one run of the application without the need of a separate caulk reshaping tool.

Figure 4B:
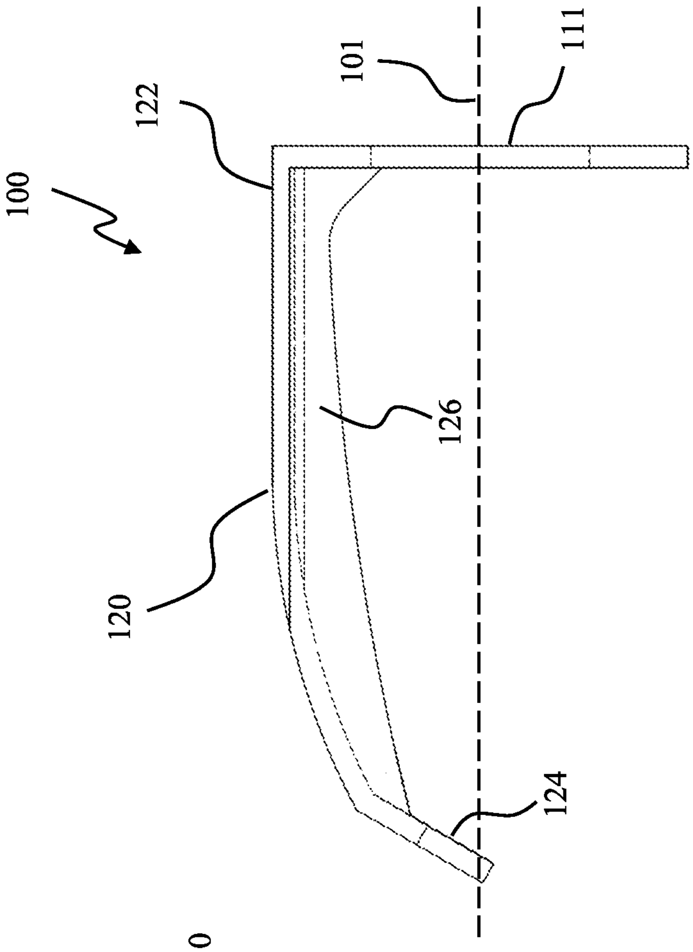
FIGS. 4A and 4B are perspective and side views of an adaptor according to certain embodiments of the present disclosure.
Figure 4A:
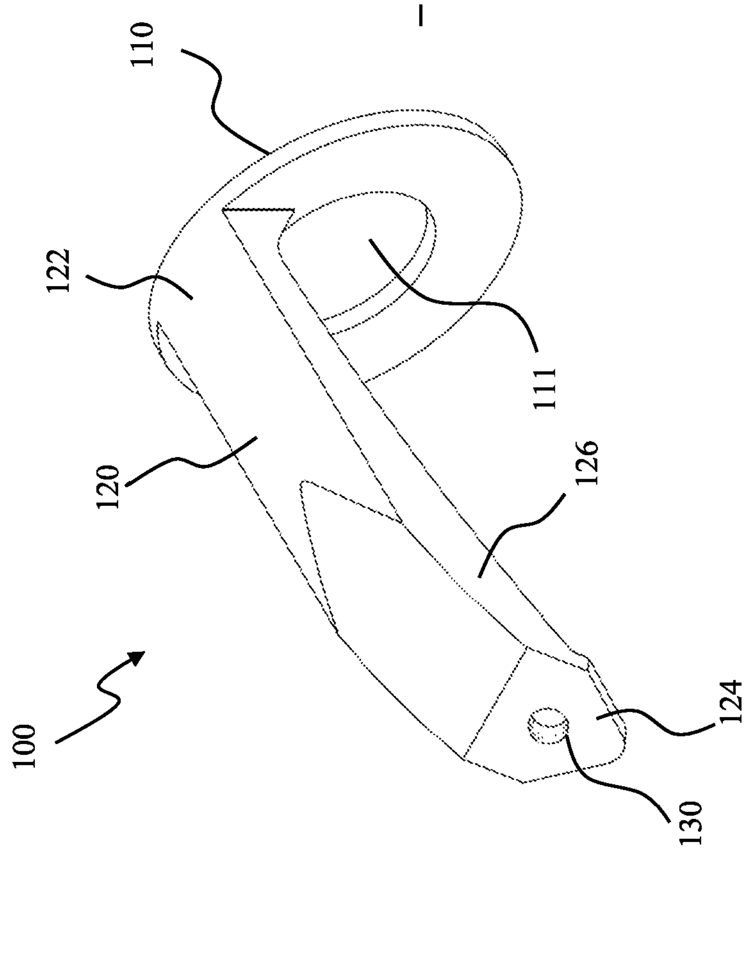

FIGS. 4A and 4B show alternative designs of the adaptor, which also includes an elongated portion 120 extending from the base plate 110 along an axis 101 perpendicular to the base plate 110. The elongated portion 120 includes a first, proximal end 122 and a second, distal end 124. Note in these embodiments, the elongated portion 120 is not overall curved, but includes a first straight section, followed by a curved section, and then an inwardly bent second end.

As shown in FIG. 4A, at the second end 124 there is a through hole 130 as an engagement element for attachment of replacement tips, as will be shown further below.

Figure 5B:
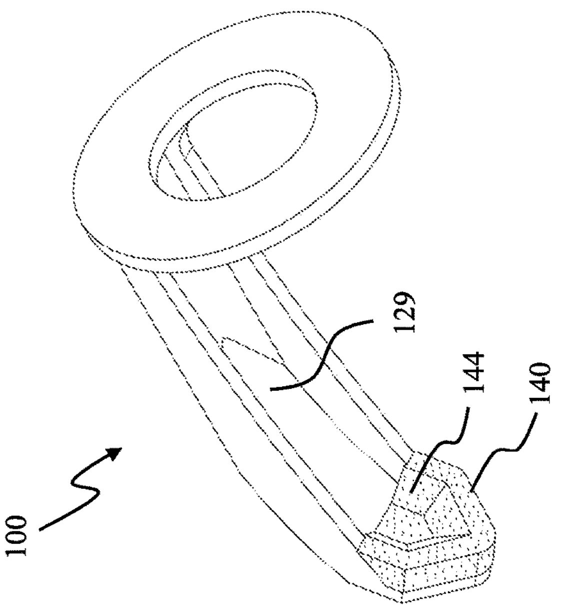
FIGS. 5A-5C are different views of an adaptor fitted with a replacement tip according to certain embodiments of the present disclosure.
Figure 5C:
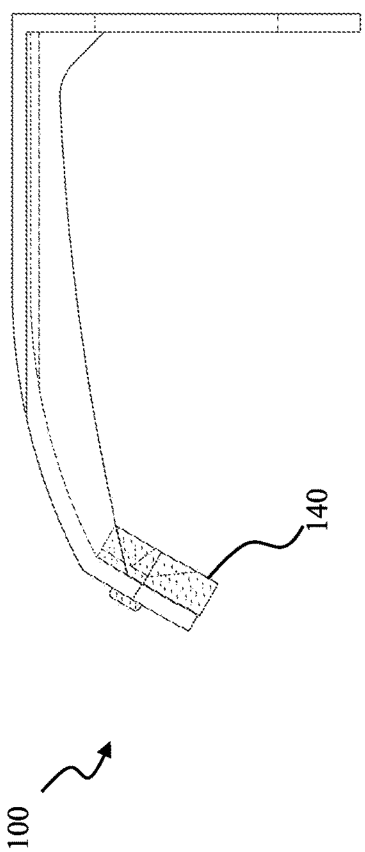
Figure 5A:
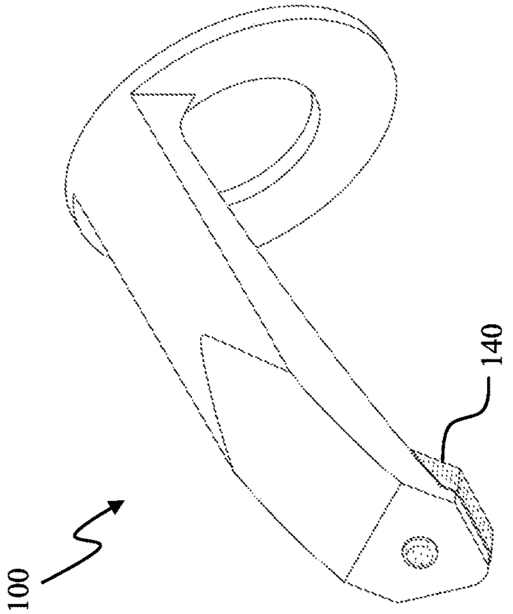

FIGS. 5A-5B are two perspective views of the adaptor illustrated in FIGS. 4A-4B fitted with a replacement tip 140 (which will be shown and described in more detail in connection with FIGS. 6A-6E below). As shown in FIG. 5B, on the interior side of the elongated portion there is a cavity 129 formed between the two side skirt portions 126. This cavity 129 has a larger volume than the cavity 144 on the replacement tip 140, and can be used as the main collection reservoir for excess caulk scaped from the caulking operation. FIG. 5C is a side view of the adaptor fitted with the replacement tip.

Figure 6A:
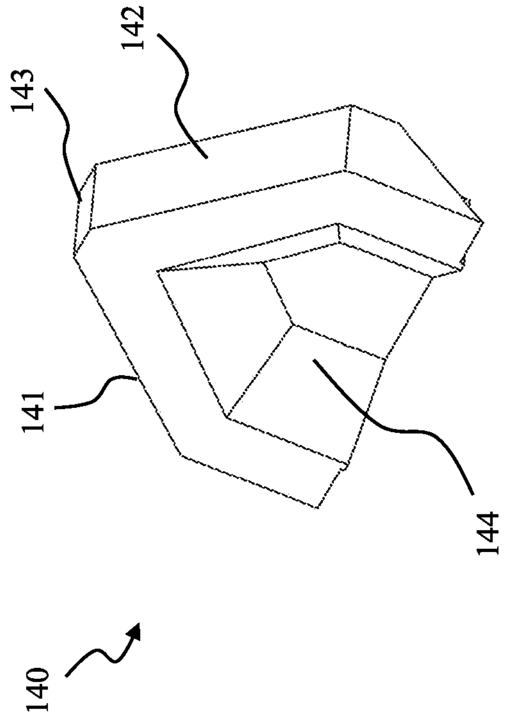
FIGS. 6A-6D are different views of a replacement tip according to certain embodiments of the present disclosure.
Figure 6B:
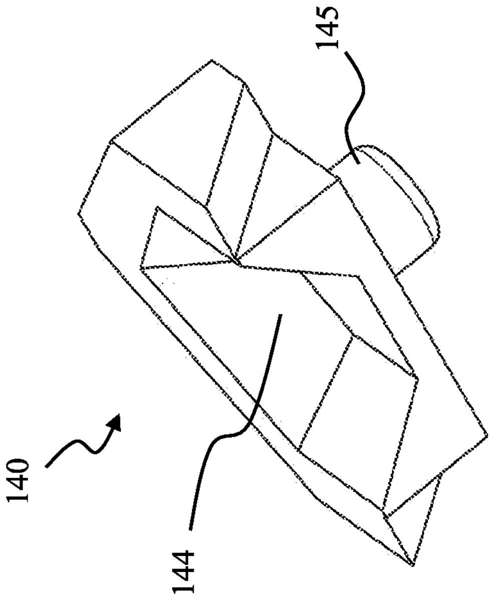
Figure 6C:
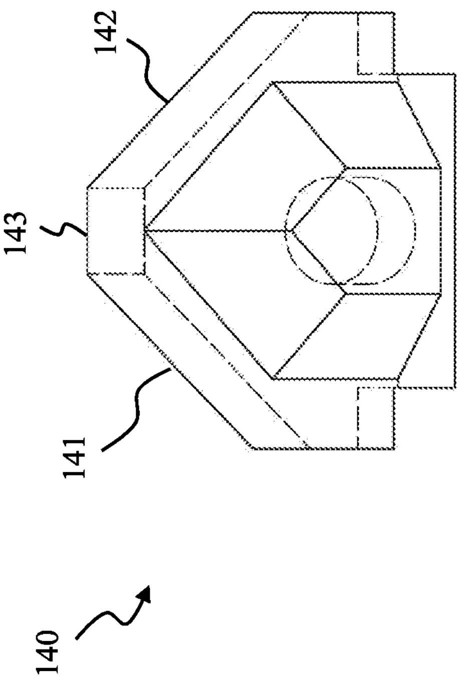
Figure 6D:
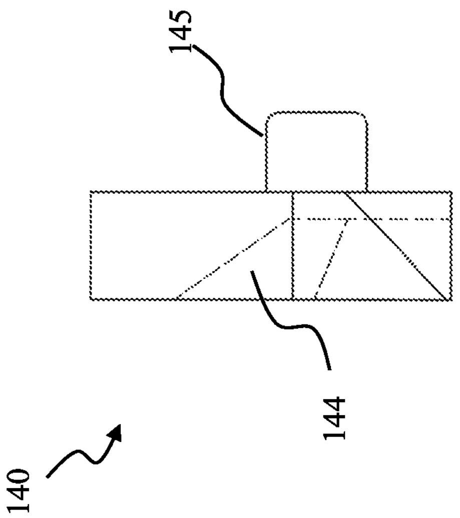
Figure 6E:
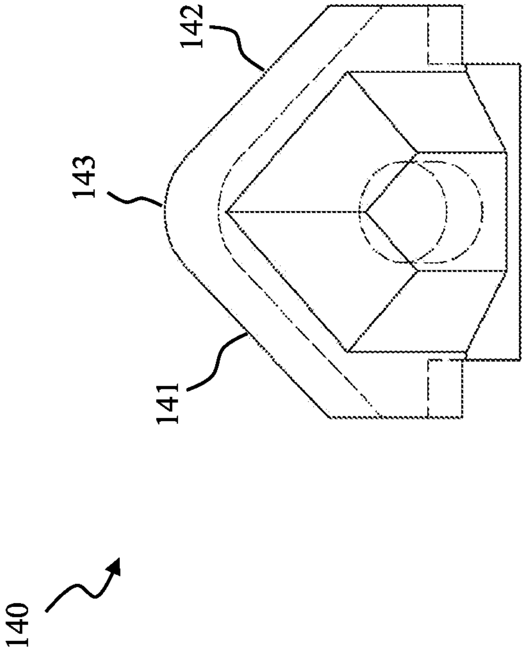
FIG. 6E is a front view of a replacement tip according to certain embodiments of the present disclosure.

FIGS. 6A-6E are views of the replacement tip 140 shown in FIGS. 5A-5C. As shown, the replacement tip can include two side surfaces 141 and 142, and a terminal end surface 143 (which when installed to the second end of the adaptor will be located to the furthermost point from the base plate). The two side surfaces 141 and 142 can form a right angle, but can also form other angles as desired, e.g., an acute angle or obtuse angle. The terminal end surface can be a flat surface (shown in FIGS. 6A and 6C), or can be a rounded (or curved) surface (as shown in FIG. 6E). The variances in the terminal end surface can produce different caulk profiles after the reshaping through the adaptor. On one side, the replacement tip can include a protrusion 145 which can be used as the engagement mechanism to attach to the adaptor (e.g., snap fitted to the through hole shown in FIG. 4A). Although a simple button-shape protrusion is shown and illustrated, it is understood that other types of engagement or coupling between two separate parts are contemplated, especially those based on friction that allow for easy attachment and detachment. On the other side (the side opposing the side contacting/engaging the adaptor), the replacement tip includes a cavity 144 to collect excess caulk removed in the operation of applying the caulk.

The replacement tip 140 can be constructed of an elastomeric material (e.g., rubber or rubber-like material) to provide the desired feel and cushioning effect for shaping/scraping the fresh caulk. For example, the elastomeric material can be Neoprene, nitrile rubber, silicone rubber, EPDM, SBR, polyurethane, etc. The selection of the material for the replacement tip can be based on the specific applications, e.g., whether the crack to be caulked is between woods, between sheetrocks, or between tiles. Based on caulk material (content of the caulk tube) a user can use appropriate tip suggested for with the material to be used for reshaping.

The adaptor disclosed herein can each provided with a plurality of replacement tips of varying sizes and configurations, e.g., with different terminal end width or curvature (or radius), different angles formed by the two side surfaces, or different softness in material. The replacement tip can be easily attached to and removed from the adaptor, making the adaptor more versatile for use in in many different applications as needed or desired.

Figure 7:
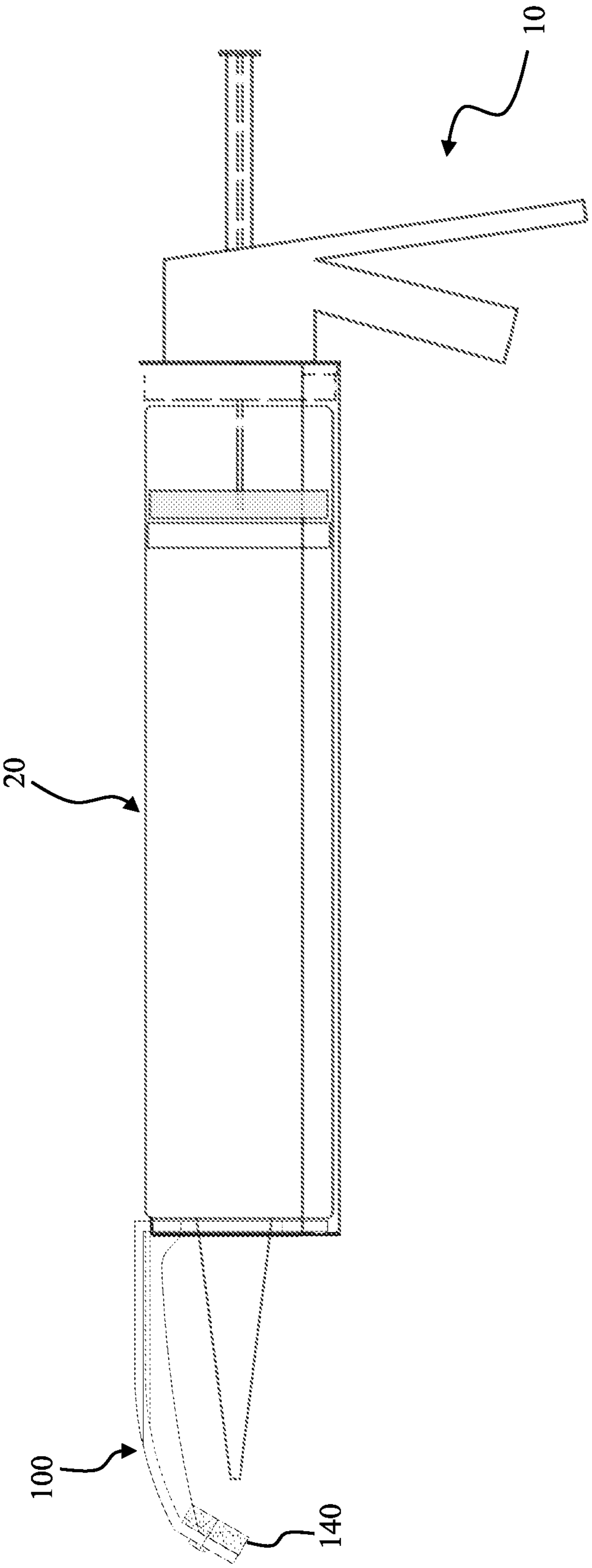
FIG. 7 is a schematic depiction of an adaptor fitted with a replacement tip according to certain embodiments of the present disclosure, as loaded on with a caulk tube on a caulk gun.

An adaptor fitted with a replacement tip can be loaded with a caulk tube onto a caulk gun by a procedure similar to what has been shown in FIGS. 3A-3C (the replacement tip can be attached first). A schematic illustration of an adaptor fitted with a replacement tip loaded on with a caulk tube on a caulk gun is shown in FIG. 7.

Figure 8:
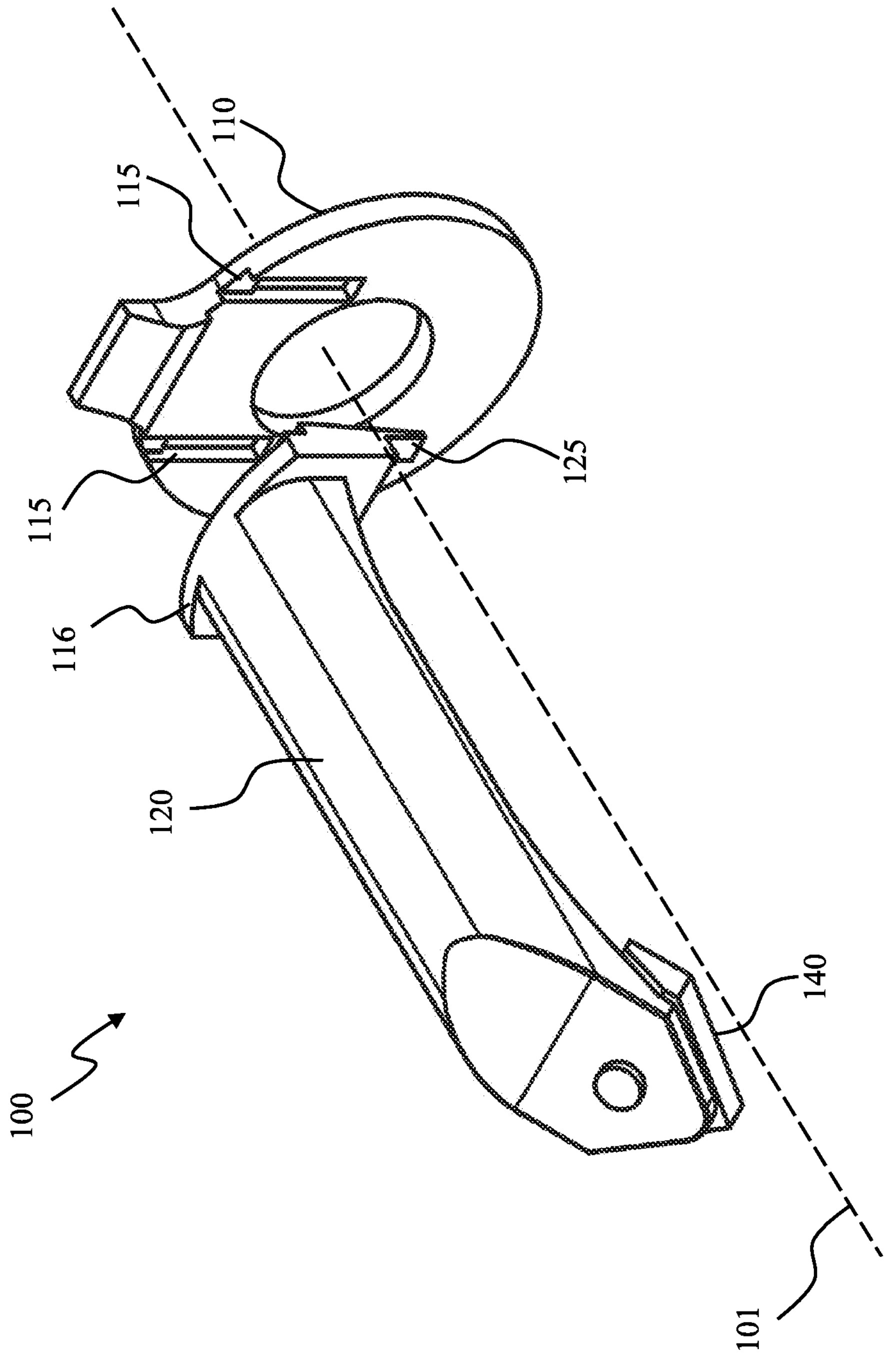
FIG. 8 is a schematic depiction of an adaptor comprising separate parts that can be assembled according to certain embodiments of the present disclosure.

In some examples, the adaptor can be constructed in separate parts, e.g., the base plate can be constructed as a separate piece from the elongated portion, as illustrated in FIG. 8. As shown in FIG. 8, the base plate 110 includes two side grooves 115, while the elongated portion 120 (with attached replacement tip 140) includes two insertable portions 125 (only one is shown) that have complementary cross-section shape as the grooves 115 and can be inserted into the two grooves 115 of the base plate 110 from a direction generally perpendicular to the longitudinal axis 101 of the adaptor 110. The top clip 116 can lock the top surface of the elongated portion 120 in place with the base plate 110. For this two-part construction embodiment, the base plate can be loaded first with a caulk tube on a caulk gun, and then the elongated portion (together with replacement tip, if needed) can be slidably fitted onto the base plate. If midway on a project using a caulk tube, one need to temporarily remove the elongated portion (e.g., to use it alone to work on caulk on a tight corner), one can easily remove it and reattach it without removing the caulk tube from the caulk gun.

Figure 9:
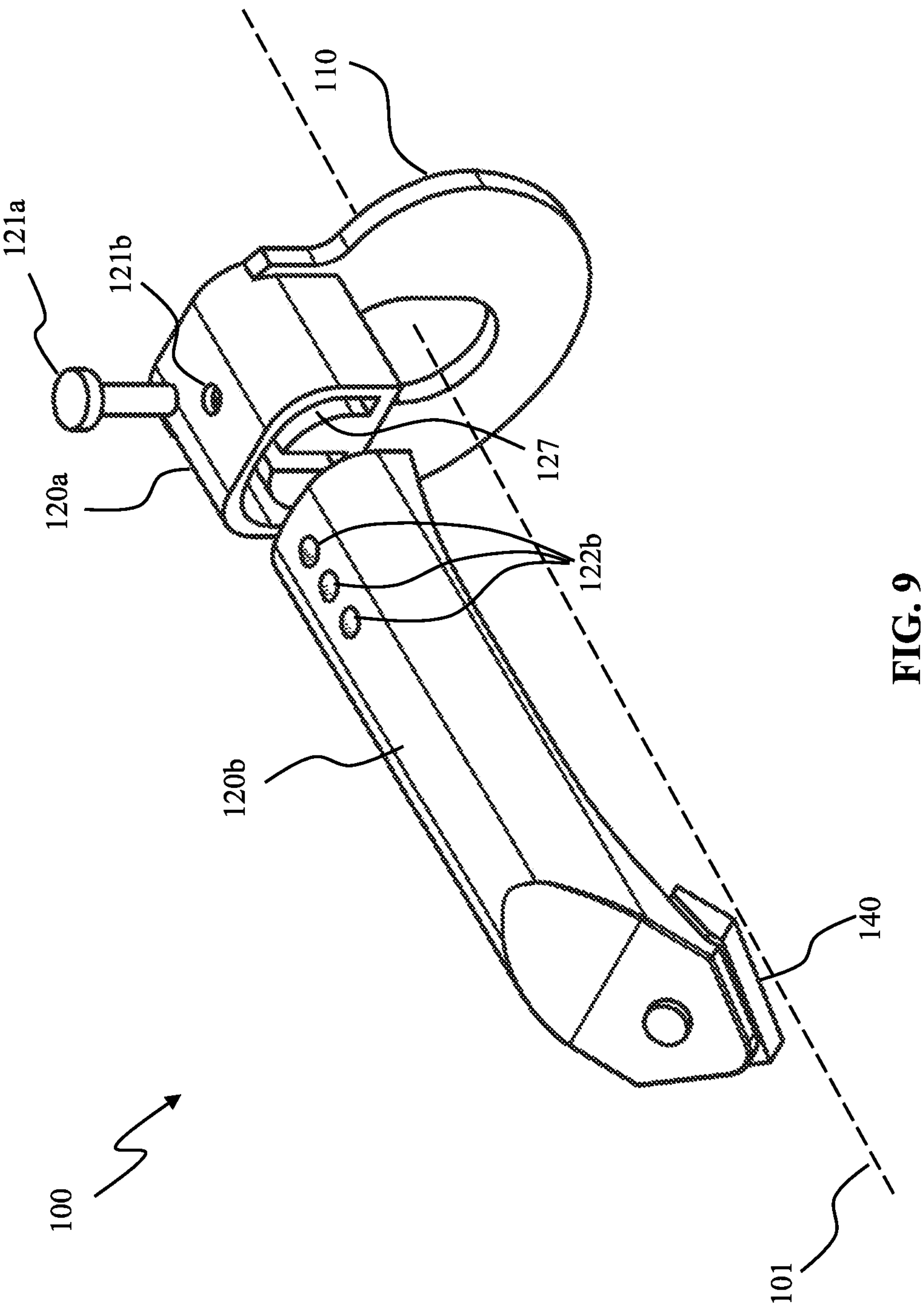
FIG. 9 is a schematic depiction of an adaptor comprising separate parts that can be slidably coupled together, according to certain embodiments of the present disclosure.

In some examples, and as illustrated in FIG. 9, the adaptor can take a configuration such that the elongated portion includes a first portion 120*a* proximal to the base plate 110, and a second portion 120*b* distal to the base plate 110, wherein the first portion 120*a* comprises a channel 127 to slidably engage the proximal end of the second portion 120*b* to allow the second portion 120*b* to move along the axis relative to the first portion 120*a* (and the base plate 110). In this way, the overall working length of the adaptor can be adjusted. Further, the second portion can include a plurality of engagement elements, e.g., open holes 122*b*, arranged along the longitudinal axis 101 of the adaptor to control the inserted length of the second portion 120*b* into the first portion 120*a*. A through hole 121*b* is provided on a top cover of the first portion, and a locking insert 121*a* is provided that can be inserted into the hole 121*b*, and into one of the holes 122*b*. In this manner, a few different selectable positions can be created to provide a few different discrete work lengths for the adaptor, which can be useful for different circumstances or for different caulk tubes.

While illustrative embodiments of the invention have been disclosed herein, numerous modifications and other embodiments may be devised by those skilled in the art in accordance with the invention. For example, the various features depicted and described in the embodiments herein can be altered or combined to obtain desired caulk reshaping tool characteristics in accordance with the invention, e.g., depending on the various caulking gun configurations, different shape of base plate and its locking or insertable positions can be designed. Therefore, it will be understood that the appended claims are intended to cover all such modifications and embodiments, which are within the spirit and scope of the present invention.

The invention claimed is:

1. A device for scraping caulk adapted to be used with a caulk gun having a cartridge holder front plate and a cartridge plunger, the device comprising:

a base plate having a central void; and an elongated portion extending from the base plate along a central longitudinal axis perpendicular to the base plate, the elongated portion comprising a first, proximal end and a second, distal end, wherein the second end is closer to the central longitudinal axis than the first end;

wherein the base plate is configured to be disposed against and contact the cartridge holder front plate of the caulk gun and encircle a nozzle of a caulk tube.

2. The device of claim 1, wherein the first end having has a width greater than the second end, and tapers toward the second end.

3. The device of claim 1, wherein the second end is curved or bent toward the central longitudinal axis.

4. The device of claim 1, further comprising a strengthening ridge disposed on an interior side of the elongated portion.

5. The device of claim 1, wherein the base plate comprises a complete ring.

6. The device of claim 1, wherein the elongated portion generally curves toward the central longitudinal axis.

7. The device of claim 1, wherein the base plate and the elongated portion are constructed from a plastic in one piece.

8. The device of claim 1, wherein the base plate and the elongated portion are constructed in separate parts, and are configured to removably engage each other.

9. The device of claim 8, wherein the elongated portion further comprises a first portion proximal to the base plate, and a second portion distal to the base plate, wherein the first portion comprises a channel to slidably engage the second portion to allow the second portion to move along the axis relative to the first portion.

10. The device of claim 9, wherein the second portion comprises a plurality of engagement elements arranged along the central longitudinal axis.

11. The device of claim 1, wherein the elongated portion can flex relative to the central longitudinal axis.

12. The device of claim 1, wherein the second end includes an engagement element for engaging a replacement tip.

13. The device of claim 12, wherein the engagement element is a through hole.

14. The device of claim 12, further comprising:

a replacement tip constructed with an elastomeric material, the replacement tip configured to engage the second tip of the elongated portion.

15. The device of claim 14, wherein the replacement tip has a flat terminal end.

16. The device of claim 14, wherein the replacement tip has a rounded terminal end.

17. The device of claim 14, wherein the replacement tip comprises a cavity for collecting excess caulk.

18. The device of claim 14, wherein the engagement element of the elongated portion is a through hole, and wherein the replacement tip comprises a protrusion which can be fitted to the through hole.

19. The device of claim 1, wherein the elongated portion comprises a cavity for collecting excess caulk.

* * * * *